United States Patent
Zillman

[11] 3,764,149
[45] Oct. 9, 1973

[54] ROTARY SEAL
[75] Inventor: Rex L. Zillman, Longview, Tex.
[73] Assignee: R. G. Le Tourneau Inc., Longview, Tex.
[22] Filed: Apr. 1, 1971
[21] Appl. No.: 130,341

[52] U.S. Cl. .................................. 277/9, 277/220
[51] Int. Cl. ............................................ F16j 15/16
[58] Field of Search ...................... 277/5, 9, 30, 81, 277/95, 138, 147, 151, 220; 285/3, 4, 420

[56] References Cited
UNITED STATES PATENTS

| | | | |
|---|---|---|---|
| 3,708,834 | 1/1973 | Anderson et al. ................... | 24/279 |
| 3,565,375 | 2/1971 | Babb ............................. | 248/74 PB |
| 1,296,181 | 3/1919 | Grigg .............................. | 277/147 |
| 1,505,883 | 8/1924 | Gleason ........................... | 24/279 |
| 1,991,491 | 2/1935 | Calkins et al. ..................... | 277/95 X |
| 2,231,947 | 2/1941 | Rich ............................... | 277/95 X |

FOREIGN PATENTS OR APPLICATIONS
600,189  6/1960  Canada ................................ 24/279

Primary Examiner—William F. O'Dea
Assistant Examiner—Peter D. Ferguson
Attorney—Wm. T. Wofford, Robert A. Felsman, James C. Fails and Arthur F. Zobal

[57] ABSTRACT

A seal that can be employed in a variety of applications characterized by a lineal member of resilient material adapted to have its ends brought together, with a first protrusion at one end and a plurality of longitudinally spaced apart protrusions at the other end. The lineal member is adapted to be severed adjacent the respective protrusions, so as to be brought into conforming engagement with the one end for effecting a seal about different size shafts carried by members that may pivot or rotate with respect to each other. The protrusions are fastened together with a suitable fastener to complete the seal. Also disclosed are specific structure and materials for use in making a preferred embodiment of the seal.

8 Claims, 3 Drawing Figures

PATENTED OCT 9 1973 3,764,149
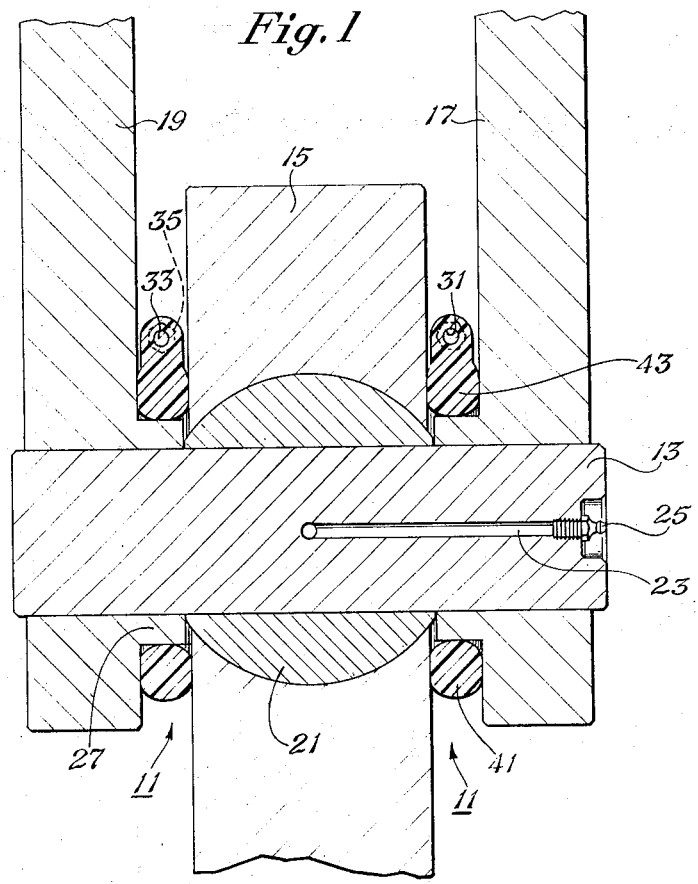
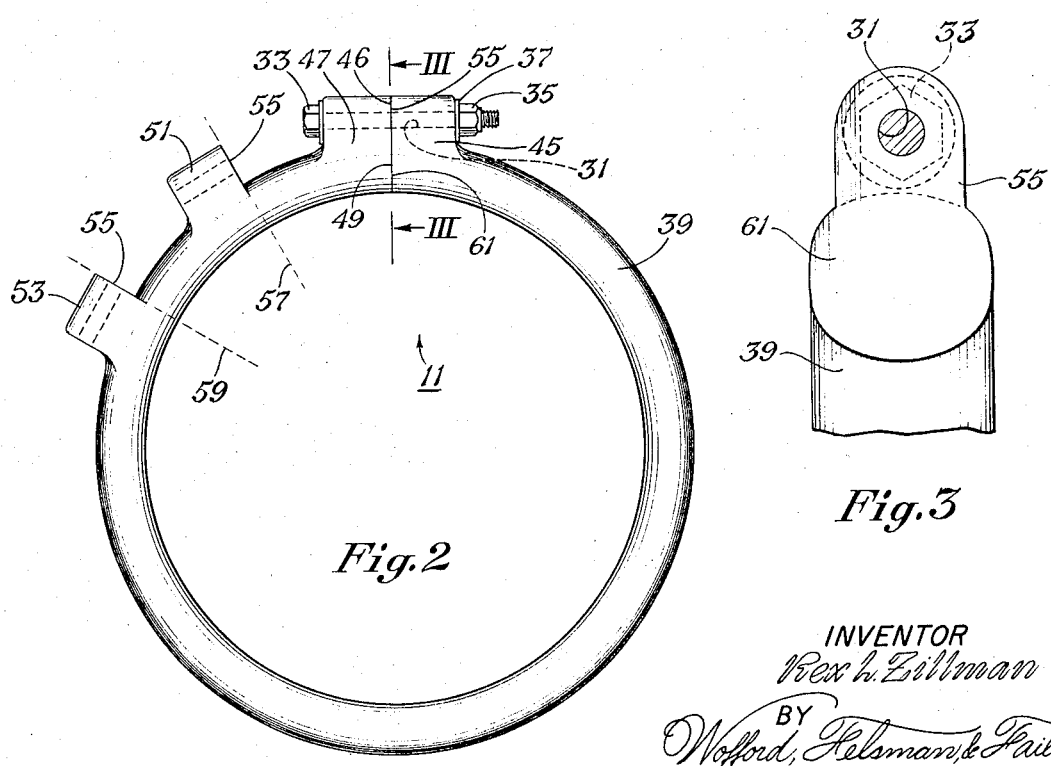
INVENTOR
Rex L. Zillman
BY
Wofford, Felsman, & Fails
ATTORNEYS

ROTARY SEAL

BACKGROUND OF THE INVENTION

1. Field of the Invention

This invention relates to a seal means; and, more particularly, to a seal which can be employed about a shaft such as a pivot pin between two supporting members that have a pivotal or rotating movement with respect to one another.

2. Description of the Prior Art

It is conventional practice in a joint having a pivot pin carried by a plurality of supporting members that have at least pivotal movement therebetween to have a gap or space between the members to facilitate assembly and prevent interference between the memers carrying the pivot pin. Ordinarily, it is desirable to retain grease within the joint about the pivot pin to minimize friction with respect to one or more of the members. In the past it has been the practice to employ grease socks or dust covers. Use of such covers present problems when it is desired to seal intermediate members that have pivotal or rotational movement therebetween. Also known in the prior art are ring seals whose ends are brought together with a fastening means such as a metallic ring thereover. Such practice has required stocking a plurality of rings, one for each diameter pivot pin or shaft. The prior art has seen a wide variety of other and different types of seals for retaining grease within a joint, but has not supplied a simple seal that can be readily emplaced in a wide variety of different applications about different diameter shafts or pins without requiring the stocking of a large variety of seals.

BRIEF DESCRIPTION OF THE DRAWINGS

FIG. 1 is a partial cross sectional view showing a seal about a pivot pin carried intermediate a plurality of supporting members mounted for pivotal movement with respect to each other, in accordance with one embodiment of this invention.

FIG. 2 is a side elevational view of the seal employed in the embodiment of FIG. 1.

FIG. 3 is a partial end view, taken along the lines III — III of FIG. 2.

DESCRIPTION OF THE PREFERRED EMBODIMENT

It is an object of this invention to provide an improved seal that obviates the disadvantages of the prior art seals and enables stocking a single seal for a wide variety of applications.

It is also an object of this invention to provide a seal which is useful, not only for a wide variety of different diameter shafts, but also useful between members that have rotational or pivotal motion therebetween.

Other objects of the invention will become apparent from the following description taken in conjunction with the drawings.

Referring to FIG. 1, a seal 11 is shown emplaced about a pivot pin 13 and intermediate a first member 15 and a second member 17. A second seal 11 is emplaced intermediate the first member 15 and another second member 19. The second members 17 and 19 may comprise mounting brackets or arms that are attached to the frame of a vehicle; such as, a large front end loader. The first member 15 may comprise a member that is ultimately connected with a movable portion; such as, the bucket of a front end loader. As illustrated, the pivot pin 13 has a spherically-shaped surface, or ball, 21 to allow a degree of universally pivotal motion of the first member 15, without restricting it to pivotal movement in a single plane. A lubrication passageway 23 having an exterior lubrication fitting 25 allows lubricating the interface between the ball 21 and the first member 15. As is well recognized, the grease that is injected via the lubrication passageway will tend to work from the interface into the gap or space 27 intermediate the first and second members. The seals 11 are sealingly emplaced about the pivot pin 13 for retention of the grease within the gap and for exclusion of dirt and the like from the gap. Because the seals 11 are resilient, they accommodate, to some degree, the movement of the first member in a plurality of planes. Moreover, the seal means 11 rebound to their shape to retain the desired sealing effect, even after being subjected to compression.

The seals 11 may be joined by any suitable fastening means interserted through the means for receiving the fastening means. As illustrated, the means for receiving the fastening means comprises an elongate aperture means 31 through which a bolt 33 is emplaced and the nut and lock washer 35 and 37 tightened, as can be seen in FIG. 2. Thus, the two abutting ends of the seal 11 are pulled together in conforming relationship to complete the circumferential seal.

As can be seen in greater detail in FIGS. 2 and 3, the seal 11 comprises a lineal member 39 formed of a resilient material, as illustrated by the cross sectioned areas 41 and 43, FIG. 1. The area 43 represents a cross section taken slightly to one side of the joint, primarily to show an integral construction for the lineal member 39 and the protrusion means; such as, the first protrusion means 45. As illustrated in FIG. 2, the lineal member 39 is adapted to have its ends brought together. Expressed otherwise, the lineal member may be formed of straight resilient material; or, preferably, preformed in a circular configuration to facilitate joinder of the ends.

The first protrusion means 45 is disposed adjacent one end 49 of the lineal member 39. The first protrusion means 45 has an abutting end 46 adjacent the end 49 of the lineal member and has the means for receiving a fastening means, illustrated by the aperture means 31.

A plurality of second protrusions means 47, 51 and 53 are disposed on the lineal member for joinder with the first protrusion means to fit about predetermined diameter shafts, or pivot pins. Each of the plurality of second protrusion means have a second abutting end 55 for being conformingly emplaced adjacent the first abutting end 46 of the first protrusion means 45. As illustrated, the respective abutting ends are all substantially planar to facilitate conforming abutment. If desired, other types of conforming abutments; such as, corrugated ends; could be employed. The use of other types of conformingly abutting ends make more difficult, however, the severing of the lineal member 39 to effect conforming abutment. Expressed otherwise, the lineal member is adapted to be severed along appropriate planes; such as, dashed lines 57 and 59; to effect conforming abutment with the end 49. A substantially planar cut is easily made and hence this embodiment is the preferred embodiment. For example, an operator in the field may easily replace the seal with a simple implement such as a pocket knife by making the cut in substantially the same plane as the plane of the abutting end 55.

The second protrusion means 47 is disposed adjacent the other end 61 of the lineal member. The remaining second protrusion means; such as, protrusion means 51 and 53; are spaced at predetermined distances longitudinally along the lineal member 39 from the second protrusion means 47 in accordance with the predetermined applications for which the seals will be employed. That is, the distances are determined by the respective diameters that are ultimately desired for the seal means when it is emplaced about the respective shafts or the like. Each of the second protrusion means also has means for receiving a fastening means, illustrated by elongate aperture means 31, FIG. 2. As can be seen in FIG. 3, the end 61 is preferably formed substantially planar with the abutting end 55 so that the two ends of the seal may be readily joined along a given radial plane to form the desired sealing relationship. The bolt 33 is merely typical of suitable fastening means. Other suitable fastening means and means for receiving the fastening means may be employed if desired. For example, an elongate fastening means may be emplaced in an elongate groove means. The other types of fastening means are, however, less preferred because they tend to become loosened with wear and slip out, whereas the bolt and aperture are readily retained within the protrusion means and can be tightened by the operator as they wear.

The lineal member may have any cross sectional shape desired. Preferably, it has a substantially circular cross sectional shape for easy fabrication and easy emplacement about the pin means. Other cross sectional shapes; such as square, or octagonal shapes; could be employed, if desired. The protrusion means are preferably integrally formed with the lineal member, as illustrated. If desired, however, the protrusion means may be of another material, such as metal, with suitable retaining means fixedly attached to the lineal member 39; for example, with roots embedded in the lineal member 39.

The resilient material may comprise any material that is resilient, will resist the deleterious effect of dust and grease; and yet, will retain the desired long life under the friction of the relative movement between the members. Preferably, a grease-resistant synthetic rubber; such as Buna N, SAE (Society of Automotive Engineers) Class 1 rubber; or the grease-resistant thermoplastic materials such as nylon, orlon, or acrylonitrile butadiene styrene copolymer are employed. The grease-resistant synthetic rubbers are particularly preferred because of their greater elasticity and resiliency and their availability in a variety of durometer hardnesses. For example, a durometer hardness of about 70 has been found to give good results.

From the foregoing description, it can be seen that this invention accomplishes the objects delineated hereinbefore and alleviates the difficulties with the prior art seals. Specifically, it provides a single seal that is widely useful for a variety of applications, including emplacement contiguous rotary members, and that decreases warehousing costs. For example, although only 3 second protrusion means are shown, any number of second protrusion means may be employed, commensurate with the number of diameters of shafts about which the seal will be emplaced.

Although the invention has been described with a certain degree of particularity, it is understood that che present disclosure is made only by way of example and that numerous changes in the details of construction and the combination and arrangement of parts may be resorted to without departing from the spirit and the scope of the invention.

I claim:

1. A rotary seal that is adapted for a plurality of applications comprising:
   a. a lineal member formed of resilient material and adapted to have its ends brought together in conforming relationship for encircling a shaft or the like and engaging a pair of surfaces, said lineal member being sufficiently resilient and having a cross-sectional shape suitable for sealing between two relatively moving surfaces;
   b. a first protrusion means disposed adjacent one end of said lineal member, said protrusion means having a first abutting end adjacent said one end of said lineal member and having means for receiving a fastening means; and
   c. a plurality of second protrusion means disposed on said lineal member and having respective second abutting ends; one of said second protrusion means being disposed adjacent the other end of said lineal member, having a second abutting end adjacent the other end of said lineal member so as to be adjacent said first abutting end when said other end is being joined with said one end; and the remainder of said second protrusion means being spaced longitudinally of said lineal member from said one second protrusion means at predetermined distances in accord with the predetermined applications for which said seal will be employed; said lineal member being adapted to be served at the abutting end of any one of said second protrusion means to facilitate joinder with said one end; said second protrusion means also having means for receiving said fastening means.

2. The seal of claim 1 wherein said abutting ends of said first and second protrusion means have conforming relationship.

3. The seal of claim 2 wherein said abutting ends are substantially planar to facilitate conforming abutment.

4. The seal of claim 3 wherein said first abutting end is substantially planar with said one end of said lineal member and said lineal member is adapted to be severed in substantially the same planes as the second abutting ends of said second protrusion means.

5. The seal of claim 1 wherein said means for receiving fastening means comprises an elongate means for receiving an elongate fastening means.

6. The seal of claim 1 wherein said lineal member has a substantially cylindrical shape with a substantially circular cross section and said protrusion means are integrally formed therewith.

7. The seal of claim 1 wherein said resilient material comprises a grease-resistant synthetic rubber.

8. The seal of claim 1 wherein said resilient material comprises a grease-resistant thermoplastic material.

* * * * *